United States Patent [19]

Battersby

[11] Patent Number: 4,490,447
[45] Date of Patent: Dec. 25, 1984

[54] BATTERY SEPARATORS

[75] Inventor: William R. Battersby, Lexington, Mass.

[73] Assignee: USM Corporation, Farmington, Conn.

[21] Appl. No.: 597,386

[22] Filed: Apr. 6, 1984

[51] Int. Cl.³ .............................................. H01M 2/16
[52] U.S. Cl. .................................... 429/143; 429/146; 429/254
[58] Field of Search ......................... 429/143, 146, 254

[56] References Cited

U.S. PATENT DOCUMENTS 2,465,493  3/1949  Strickhouser et al. ............. 429/147
3,351,495  11/1967 Larsen et al. .................. 429/254 X
4,000,352  12/1976 Hollenbeck ...................... 429/147
4,403,024  9/1983  Gordon et al. ................... 429/146

Primary Examiner—Charles F. LeFevour
Attorney, Agent, or Firm—John P. Morley

[57] ABSTRACT

Novel, improved battery separators carrying a plurality of polymeric ribs on at least one separator surface. The battery separators are produced by extruding a plurality of ribs in the form of molten polymeric rib providing material onto the surface of a battery separator to bond the material to the separator surface and cooling the extruded rib material to a solidified state. The molten polymeric rib providing material of this invention includes a mixture or blend of polypropylenes and an ethylene propylene diene terpolymer.

7 Claims, 4 Drawing Figures

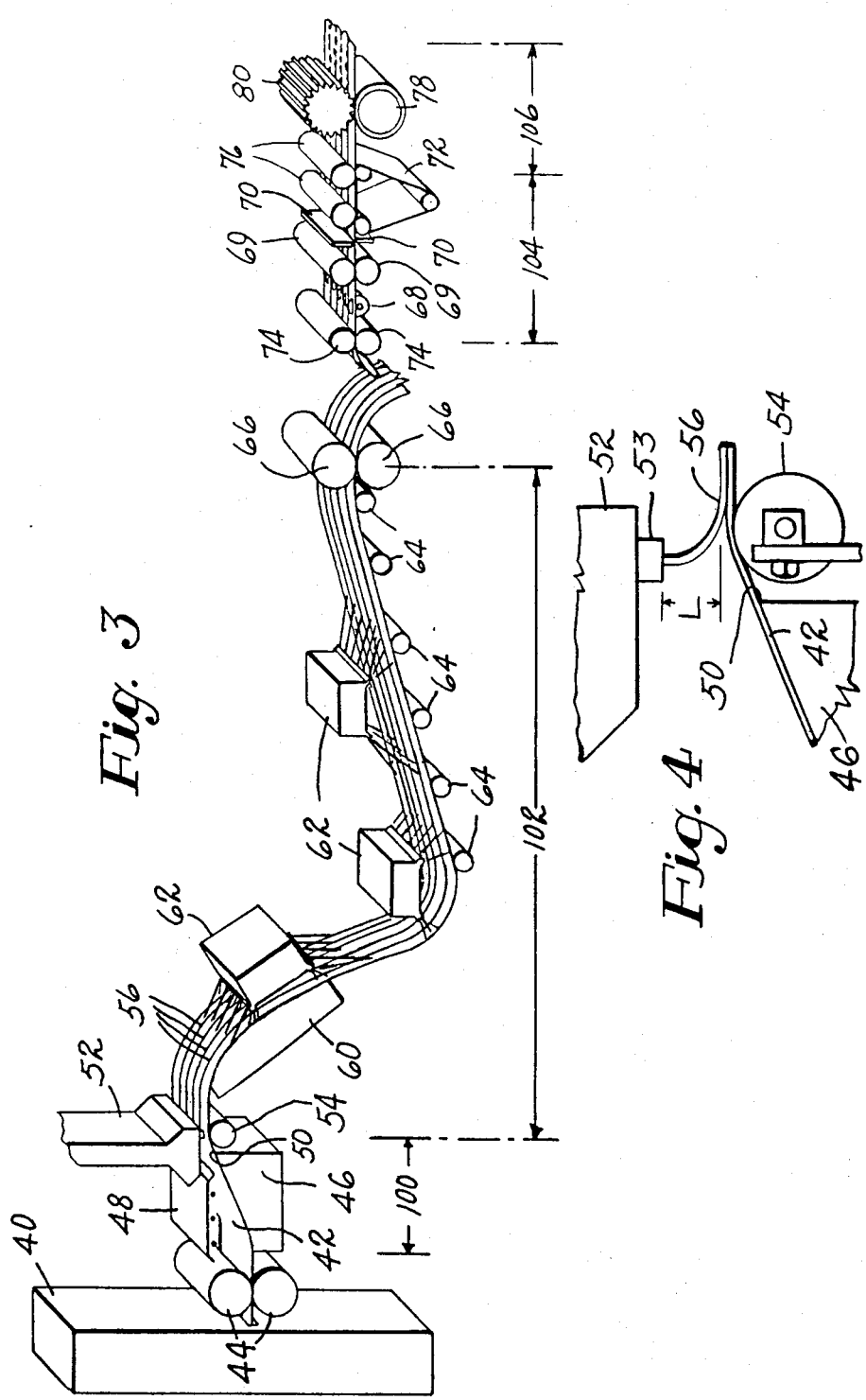

BATTERY SEPARATORS

BACKGROUND OF THE INVENTION

1. The Field of the Invention

This invention relates to battery separators and particularly to battery separators carrying a plurality of polymeric ribs on at least one surface of the separator.

2. Description of the Prior Art

Battery separators are known to the art and their desired combination of performance characteristics are well defined. Essentially, a separator must have low electrical resistance, must be wettable by, but resistant to, the electrolytic fluid and must provide sufficient porosity to permit effective passage of electrolyte through the separator when positioned between adjacent positive and negative plates of the battery. Ideally, battery separators should provide minimal thickness and weight per unit area but at the same time have sufficient mechanical strength and integrity to sustain the conditions involved in the production and handling of the separator as well as the conditions encountered in the assembly and operation of the battery. Known separators are fabricated of separator base materials which include among others, cellulosic fibers, polyoiefin fibers, glass fibers, polyester fibers, phenol formaldehyde coated fibers and non-fiberous elastomeric polymers such as natural and synthetic elastomers.

Many known battery separators include protrusions carried by at least one surface of the separator. These protrusions may be carried in the form of embossed areas or as a plurality of solid ribs. Details relating to battery separators carrying such protrusions may be found in U.S. Pat. Nos. 2,465,493; 3,351,495; 3,725,130; 3,798,294; 4,000,352; 4,403,024; Canadian Pat. No. 518,249; U.K. Pat. No. 783,729 and German Pat. No. 26 84 06.

The application of protrusions to a separator surface is designed to improve the mechanical strength and integrity of the separator and/or to provide and maintain a space of predetermined thickness between the plate and battery separator. In general, either embossed or rib-like protrusions can suitably perform this function. Embossed protrusions however, can imply the possibility of non-uniform areas of thickness of the separator particularly in the embossed areas where some stretching of base material can occur. In practice, rib-like protrusions are preferred and these can be conveniently provided by extruding molten polymeric material onto the surface of the separator. The final separator usually comprises a plurality of parallel ribs which extend in continuous fashion across the surface of the separator. Details relating to a process for forming a plurality of polymeric ribs on a separator surface are described in U.S. Pat. No. 3,773,590 and in commonly owned, copending U.S. Patent Application Ser. No. 447,270, filed Dec. 10, 1982.

Continuous processes for providing permanent, extruded ribs on battery separator surfaces present special considerations and complicated problems. Initially, it is important that effective adhesion between the rib and separator be achieved almost immediately after extrusion of the rib material onto the separator surface. Normally, achievement of this adhesion is promoted by heating the separator material and extruding the polymeric material at relatively high temperatures to provide enough tackiness for the extruded rib to stick to the heated separator surface. However, close control must be maintained over the temperature of the extruded material to assure that the extruded rib will provide the predetermined height dimension when solidified. If the extrusion temperature is too high, the viscosity of the extruded material may permit excessive flow of the material before solidification. Excessive flow can result in decreased rib height and more importantly can result in increased rib width or thickness.

An important consideration in preparing polymeric rib carrying separators involves the thickness or width of the rib base. As used here, rib base thickness or width means the thickness or width of the contact area of the rib base with the separator surface. Ideally, the rib base width or thickness should be maintained at a minimum because the surface area of the separator covered by the rib base is not available for electrolyte transfer. Accordingly, increase in rib thickness - particularly at the rib base - decreases the effective electrolyte transfer surface area which in turn, increases the ohmic resistance of the separator.

One attempt to control rib base thickness has involved the extrusion of ribs having a substantially circular cross-section in order to minimize the contact area between the rib base and separator surface. However, this attempt has not proven sufficiently reliable in providing uniformly effective adhesion of the circular cross-section ribs to the separator surface. The above-mentioned U.S. Patent 3,773,590 teaches the extrusion of ribs which have substantially circular cross-section. However the rib carrying separator is passed between rollers while the ribs are still deformable and the ribs are compressed into the separator surface. This compression provides ribs of a rectangular or semi-rectangular cross-section and increases the rib base thickness of the extruded rib.

Another practice in the art involves extruding ribs of rectangular or trapezoidal cross-sections. A balance is achieved between the desired degree of tackiness for bonding and the temperature and viscosity of the extruded material by regulating the height of the molten rib material continually deposited on the moving surface of the separator. The height of the deposited molten rib material is usually somewhat greater than the height desired for the final solidified rib. After the molten material is deposited and bonded, the material is allowed to cool. Some decrease in height can occur on cooling because of shrinkage or settling and the rib base thickness usually increases until the bonded, molten material solidifies. Obviously, rib base thickness considerations become more complicated under this practice as the height of the rib is increased and ideally, the height of the rib should exceed the rib base thickness.

From the above description, it should be apparent that rib base height and thickness are primarily subject to the temperature and viscosity of the extruded material. However, additional factors are involved such as rate of extrusion and rate of separator sheet material travel. All of these are important and each must be carefully controlled and synchronized to achieve uniform rib height and minimized rib base thickness. Accordingly, there is an outstanding need in the art for a process for effectively bonding a plurality of ribs having uniform height and minimized rib base thickness to a separator sheet material. This invention is addressed in part to that outstanding need and provides a novel, relatively simple and inexpensive but particularly effective solution for the problem.

There is also another important art recognized need involved in preparing polymeric rib carrying battery separators. As those in the art know, various polymeric rib providing materials - particularly polyolefins - undergo severe shrinkage with cooling during solidification. In turn, this shrinkage can cause severe bowing or curling which adversely affects the flatness of the separator. U.S. Patent Application Ser. No. 447,270 mentioned before, provides an effective means for controlling the shrinkage problem by compressing portions along the length of the ribs to provide ribs having alternating elevated and depressed segments. The practice of the present invention also provides polymeric rib carrying battery separators which are substantially flat even though the polymeric rib providing material involves polyolefins. Accordingly, the present invention provides the capability for producing substantially flat rib carrying separators combined with the capability for effectively providing ribs of substantially uniform height and cross-sectional thickness as well as controlled rib base thickness or width.

BRIEF SUMMARY OF THE INVENTION

This invention presents to the art novel, improved battery separators carrying a plurality of polymeric ribs on at least one separator surface. Battery separators of this invention are produced by extruding a plurality of ribs in the form of molten polymeric rib providing material onto the surface of a battery separator to bond the material to the separator surface and cooling the extruded rib material to a substantially solidified state. The molten polymeric rib providing material of this invention includes a mixture or blend of polypropylenes and an ethylene propylene diene terpolymer. The mixture of polypropylenes and ethylene propylene diene terpolymer provides ribs of substantially uniform maximum height and substantially uniform base thickness along the length of the ribs. Additionally, ribs provided by the mixture do not undergo significant shrinkage on cooling so that separators carrying the ribs are substantially flat.

BRIEF DESCRIPTION OF THE DRAWINGS

FIG. 3 is a schematic view of an arrangement of apparatus suitable for the continuous production of polymeric rib carrying battery separators of the invention.

FIG. 4 is a schematic view of apparatus arranged to extrude polymeric ribs providing material onto the surface of a battery separator.

THE PREFERRED EMBODIMENTS OF THE INVENTION

Figure 1:
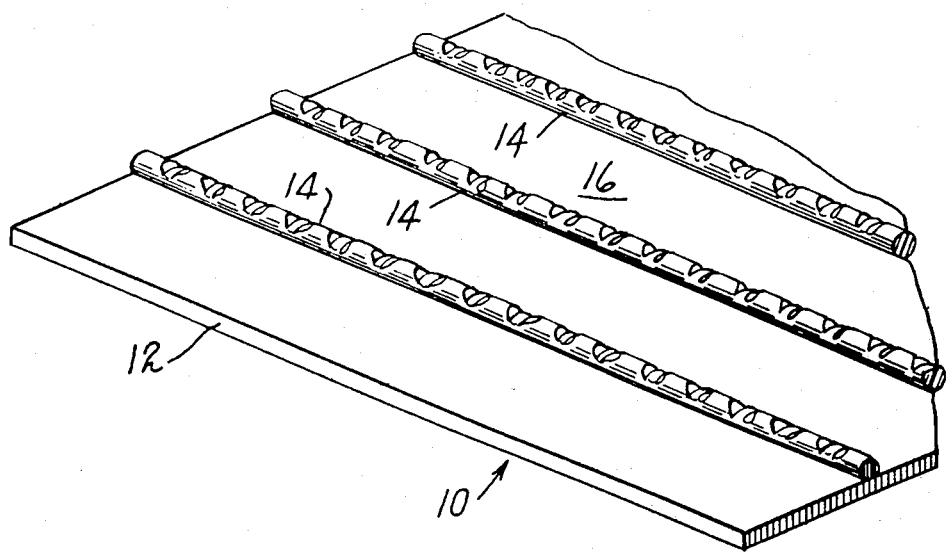
FIG. 1 is a schematic view of a portion of a battery separator carrying a plurality of segmented polymeric ribs on the separator surface.

The polymeric rib providing material used in the battery separators of this invention includes a mixture of polypropylene and ethylene propylene diene terpolymer. The polypropylene is present in an amount between about 75 to about 97 percent by weight based on the total weight of the polymeric component, i.e., the polypropylene and terpolymer and, the ethylene propylene diene terpolymer is present in an amount between about 3 to about 25 percent by weight. Oftentimes, pigments, fillers, blowing agents, stabilizers and the like can be included in the rib providing material.

Polypropylenes or mixtures of polypropylenes useful in the rib providing material of the invention are those which are extrudable below 350° F. and have the requisite temperature and chemical resistance for satisfactory performance as battery separator ribs.

In the preferred practice of the invention, the polypropylenes include a mixture of an atactic (amorphous) polypropylene and an isotactic (crystalline) polypropylene. Preferred amounts of atactic polypropylene are from about 15 to about 70 percent by weight based on the total weight of polypropylene and terpolymer. Preferred amounts of isotactic polypropylene are from about 15 to about 60 percent by weight based on the total weight of polyolefin and terpolymer. Preferably, the ratio of percent by weight atactic polypropylene, to percent by weight ethylene propylene diene terpolymer is no greater than about 5 to 1.

Preferred isotactic polypropylenes are those having a flow rate of about 50 g/10 min as measured by ASTM Test Method D 1238 L, a density of about 0.90 g/cm.$^3$ as measured by ASTM Test Method D 1505 and a Vicat softening point of about 130° C. as measured by ASTM Test Method D 1525 and a melt temperature between about 300° C. to about 320° C. A commercially available isotactic polypropylene representative of those suitable in the practice of the invention is an isotactic polypropylene sold under the tradename TENITE 4G7DP by Eastman Chemicals Incorporated.

Preferred atactic polypropylene are those having viscosities between about 1500 cP to about 2500 CP as determined at 190° C. by the Brookfield Thermosel test method, number average molecular weights between about 3000 to about 5000 as determined by Gel Permeation Chromatography and, Ring and Ball softening points between about 145° C. to about 165° C. as determined by the ASTM E28 test method. A commercially available atactic polypropylene representative of those suitable in the practice of the invention is an atactic polypropylene sold under the tradename A-FAX 940 by Hercules Incorporated.

Preferred ethylene propylene diene terpolymers are semi-crystalline, fast curing low viscosity ethylene propylene diene terpolymers. The especially preferred ethylene propylene diene terpolymers have a specific gravity at 22° C. of about 0.86 to about 0.88 and a Mooney viscosity (ML (1&4) at 121° C.) of about 25. A commercially available ethylene propylene diene terpolymer representative of those suitable in the practice of the invention is an ethylene propylene diene terpolymer sold under the tradename NORDEL 2722 by E.I. Dupont De Nemours and Company.

The polymeric rib forming materials of this invention are preferably prepared by pre-blending the ethylene propylene diene terpolymer and atactic polypropylene in a high intensity mixer such as a Banbury mixer or Sigma Blade mixer at a temperature between about 200°-215° C. until the distribution is uniform, (usually about 10-20 minutes). The isotactic polypropylene is then added slowly while the temperature of the mixer is maintained and mixing is continued until the distribution is uniform. The mixture can be extruded as ⅛" O.D. rods and cut to ⅜" lengths in conventional manner.

A rib forming material of the invention is typically provided as a composition in which the amount of atactic polypropylene is about 47 percent by weight of the total weight of polypropylenes and terpolymer, the amount of isotactic polypropylene is about 41 percent by weight and the amount of ethylene propylene diene polymer is about 12 percent by weight. This material can be used directly as a rib forming material or the material can provide a master-batch to which more isotactic and/or atactic polypropylene can be added to provide ribs of selected performance characteristics.

Rib forming materials comprising from about 15 to about 35 percent by weight isotactic polypropylene provide polymeric ribs having an especially desirable combination of performance characteristics for battery separator applications. Such materials can be continually and conveniently extruded in existing high speed production equipments at temperature of about 400° to about 500° F. to provide ribs of substantially uniform height and cross-sectional thickness. Moreover, the materials provide ribs of cross-sectional thicknesses between about 0.254 mm. to about 0.762 mm. but also provide the requisite degree of stiffness and flexibility desired for battery separator ribs. The relative amounts of isotactic and atactic polypropylenes can be adjusted over a wide range in rib providing materials of this invention. Essentially, rib providing materials of the invention having amounts of isotactic polypropylene between about 35 to about 60 percent by weight provide stiffer, more flexible ribs. Rib providing materials in which the isotactic polypropylene amounts to no more than about 30 percent by weight provide ribs which do not undergo any significant shrinkage. Accordingly, such rib providing materials can be employed to consistently provide substantially flat, rib carrying battery separators. As the amount of isotactic polypropylene is increased above about 30 or about 35 percent by weight, the degree of shrinkage of the resultant rib increases somewhat. However, any increase in the degree of shrinkage is minor and can be most effectively controlled if desired in accordance with the practice of the invention described in U.S. application Ser. No. 447,270, mentioned before.

Figure 2:
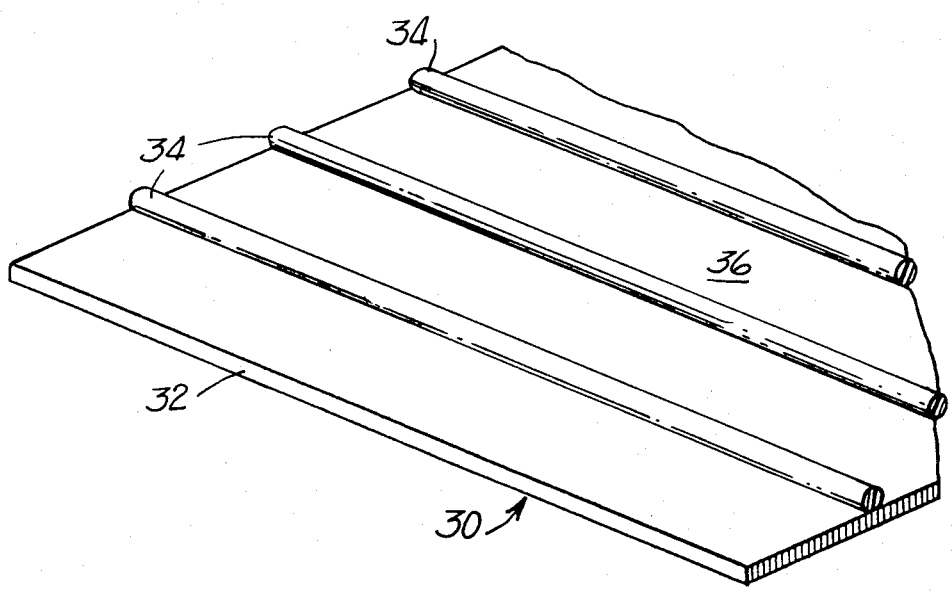
FIG. 2 is a schematic view of a portion of a battery separator carrying a plurality of continuous polymeric ribs on the separator surface.

Preferred rib carrying separators of this invention are shown in FIGS. 1 and 2. As shown there, the separator 10 (FIG. 1) comprises a separator base 12 and a plurality of solidified polymeric ribs 14 carried on surface 16 of base 12. Separator base 12 may be of any suitable battery separator base materials known to the art such as those mentioned before. Separator base materials in the practice of the invention may be the conventional phenolic or non-phenolic separator base materials but especially preferred separator base materials are described in commonly owned U.S. Patent Application Ser. No. 445,857 filed by W. J. Bodendorf on Feb. 7, 1982.

The ribs carried by battery separators of FIG. 1 are not of a continuous, substantially uniform height along the entire length of the rib as in the case of the ribs described in U.S. Pat. No. 3,773,590. Instead, continuous ribs 14 have an undulating form provided by successively repeating elevated areas 20 and depressed or nipped areas 22. Elevated areas 20 provide individual rib segments which are substantially circular in cross-sectional shape and have substantially uniform maximum heights with each segment bonded to surface 16. Depressed areas 22 provide individual rib segments which are strongly bonded to surface 16. As described in earlier mentioned, U.S. Patent Application Ser. No. 447,270, the rib segments provided by areas 22 have the capability of relieving or nullifying the forces generated during any shrinkage on cooling of the polymeric material which can cause curling of the separator. The undulating form of ribs 14 provides special advantages over prior art battery separator ribs. Each individual rib is strongly bonded to the separator surface and provides the desired uniform rib height. Additionally, the base thickness of each rib is substantially uniform along its entire length, and the rib carrying separator is substantially flat. The undulating form of rib 14 of FIG. 1 is preferred if the ribs have a maximum cross-sectional thickness of about 0.508 mm or less and/or if the polymeric rib providing material contains more than about 30 to about 35 percent by weight of isotactic polypropylene.

FIG. 2 illustrates another preferred battery separator of the present invention. As shown, the separator 30 comprises a separator base 32 and a plurality of solidifided, continuous, non-segmented polymeric ribs 34 carried on surface 36 of base 32. Ribs 34 are continuous and have a substantially uniform maximum height along the entire length of the rib. Accordingly, the practice of the present invention provides substantially flat battery separators carrying segmented ribs or carrying continuous, non-segmented ribs. Continuous ribs are particularly preferred in battery separators carrying ribs having a maximum cross-sectional thickness greater than about 0.508 mm and/or if the polymeric rib providing material contains less than about 35 percent by weight isotactic polypropylene.

A representative, illustrative rib carrying battery separator of FIG. 2 can include a separator base material as described in the aforesaid U.S. Patent Application Ser. No. 445,857 and having a thickness of about 0.14 cm. and a length of about 140 cm and width of about 148 cm. Firmly bonded to the surface of the separator base material are 10 continuous ribs. Preferred continuous ribs comprise about 42 percent by weight of atactic polyprophylene, about 48 percent by weight of isotactic polypropylene and about 10 percent by weight of ethylene propylene diene terpolymer. The ribs are arranged parallel to each other with each rib extending across the surface of the separator. Each individual rib is substantially circular in cross-section and has a maximum height of about 0.023 inches and a substantially uniform maximum cross-sectional thickness of about 0.026 inches. Maximum rib base thickness for the ribs is about 0.014 inches.

FIG. 3 illustrates an arrangement of apparatus suitable for producing rib carrying battery separators of this invention. The arrangement of apparatus shown in FIG. 3 is designed to apply a plurality of polymeric ribs to the surface of a moving battery separator sheet material as a final step in the continuous on-line production of separator materials. The arrangement of apparatus shown provides four distinct stations - a rib extrusion station 100; a rib cooling station 102; a cutting and slitting station 104 and optionally, a rib portion compressing or rib crimping station 106. For illustrative purposes, the apparatus is shown arranged at the exit of final drying oven 40 for continually moving battery separator sheet material 42. As mentioned, sheet material 42 may be any of the conventional battery separator base materials and, in on-line production operations, the sheet material is usually between about 2.7 mm. to about 2.9 m. in width and between about 0.515 mm. to about 0.9 mm. thick. Also, in conventional production operations, the speed of travel of sheet material 42 along the line can vary but usually speeds between about 0.8 to about 34 cm per second are involved.

Upon emerging from oven 40, sheet material 42 is shown passing between web pulling rolls 44 which are conventional and known to the art. Sheet material 42 is then directed to the rib extrusion station 100 which includes a heating table 46 which preferably has an upwardly extending surface as shown. Heating means 48 are arranged between rolls 44 and edge 50 (FIGS. 3 and 4) of table 46 so that the surface of sheet material 42 can be heated to temperatures between about 130° C. to about 200° C. Infra-red heating means such as quartz heaters — arranged and adapted to heat the surface of sheet material 42 to temperatures between about 130° C. to about 200° C. are particularly suitable.

An extruder 52 having a multi-hole die 53 (FIG. 4) is arranged near edge 50 so that a plurality of polymeric ribs 56 can be extruded onto the heated surface of sheet material 42. The die is preferably adapted to extrude rib material in a substantially circular cross-section shape to minimize contact area between the extruded rib providing material and the separator surface. A preferred arrangement of the extruder is shown in FIG. 4. As shown, an adjustable web bending roll 54 is arranged at the end of the upwardly extending surface of table 46. Roll 54 is adapted to carry moving sheet material 42 slightly upwardly from the edge 50 of table 46 and into close proximity to die 53. With this arrangement, the extruded molten material providing ribs 56 is continually deposited on sheet material 42 as material 42 is carried over the highest level of roll 54. In the arrangement shown, L represents the length of each extruded rib between the lip of the die and the surface of sheet material 42 and can vary depending upon the adjustment of wheel 54.

The throughput of extruder 52 is adapted to accommodate the speed and volume of polymeric material being extruded, the line speed of the separator material and the size of the ribs applied to the base. A preferred extruder is one which is capable of extruding the polymeric rib providing material heated to a temperature of about 316° C. at a rate of 0.5 gms per sec. A suitable multi-hole die arrangement involves one providing 60 circular holes each having a diameter of about 1.2 mm. The path of sheet material 42 beneath multi-hole die 53 of extruder 52 is adjusted so that the length (L, FIG. 4) of each extruded rib between the lip of die 53 and the surface of sheet material 42 is controlled within the desired limits to provide effective extrusion onto the sheet material surface and immediate bonding of the extruded material to the surface. The controlled length of the ribs (L) will vary depending primarily on the composition of the polymeric rib providing material. However, continuous polymeric ribs of uniform size can be extruded onto and bonded to the surface of separator material 42 when the length (L) is between about 1 cm to about 5 cm at line speeds between about 5 cm per second to about 34 cm per sec.

Sheet material 42 carrying the extruded and bonded ribs 56 is moved along a path to rib cooling station 102. Preferably, the path after edge 50 of cooling table 60 is defined by an arc or curvature. The degree of curvature will vary depending on such factors as the polymeric rib providing material and the extrusion temperature involved. The curvature can partially compensate for shrinkage of the polymeric rib material and promotes improved adhesion of the extruded rib material to the separator surface.

Rib cooling station 102 includes at least one cooling table 60 where one or more air blowing means 62 are arranged and adapted to cool the bonded ribs 56. The length of cooling station 102 as well as the number and arrangement of air blowing means 62 and the number of guide rollers 64 and/or pull rollers 66 associated with cooling station 102 can vary. The primary consideration controlling the variations relate to the particular polymeric rib providing material involved and the extrusion temperature. Essentially, bonded ribs 56 must be cooled in the rib cooling station to a substantially solidified state. On-line operations have included a cooling station about 520 cm in length for line speeds of about 23 cm per second and having two air blowers arranged along the cooling station to blow air on the extruded rib material. These representative operating conditions have suitably cooled a plurality of polyethylene ribs extruded on the surface of the separator material at extrusion temperatures of 316° C.

In the preferred practice of the invention, separator sheet material 42 carrying cooled bonded ribs 56 is cut and slit at a cutting and slitting station 104 before the rib carrying sheet material is transported to rib portion compressing section 106. The cutting and slitting permits the use of a single rib carrying sheet material for producing separators having the different length, width and rib height dimensions specified by customers. The slitting and cutting apparatus involved is conventional apparatus routinely used in the paper making or battery separator manufacturing art. In the apparatus shown, rotatable circular blades 68 are used to slit sheet material 42 in the lengthwise dimension while a guillotine cutter 70 is used to cut sheet material 42 along its widthwise dimension. Cutting and slitting section 104 can also include one or more pull and/or guide rolls shown as 69. In preferred on-line operations, the rib carrying separator sheet material about 100 cm wide is slit and cut into individual sheets about 15 cm long by 15 cm wide.

In producing the battery separator sheet material of FIG. 1., separators are advanced to rib portion compressing or rib crimping station 106 by a belt-driven unit 72 which has a variable speed. Preferably the belt driven unit is operated at a line speed greater than the line speed for stations 100 and 102 so that the cut separators are quickly drawn away from cutter 70. Normally sheet material 42 is allowed to dip downwardly between rolls 66 and rolls 74 in order to compensate for the different line speeds. The speed of unit 72 is also adjusted to maintain the individual slit and cut separators at a predetermined, fixed lengthwise distance from one another. The slit and cut separators pass through a set of driving rolls 76 which feed the individual slit and cut separator materials to rib crimping station 106.

Rib crimping station 106 includes a pair of driven rolls 78 and 80 which provide or the rib crimping or compressing unit. Roll 78 has a smooth coaxial cylindrical surface parallel to the axis of rotation of roll 78 while roll 80 is a scored or gear roll carrying a plurality of teeth which are cut into the coaxial cylindrical surface preferably parallel to the axis of rotation of roll 80. Roll 80 can be solid roll carrying a plurality of teeth as described or can consist of a solid roll fitted with a sleeve carrying the teeth. The gap between roll 78 and roll 80 is adjustable to control the degree of crimping to provide crimped ribs according to customers' specifications. Preferable means (not shown) are provided to separately control the speed of each roll 78 and 80; and preferably means (not shown) are also provided to maintain rolls 78 and 80 parallel to each other. These features reduce the possibility of overlapping of the individual separator materials and also assure a uniform degree of crimping for material processed through crimping station 106.

A suitable illustrative rib crimping unit for continuous on-line production of rib carrying separator materials of this invention is one in which roll 78 is about 102 cm long and has an O.D. of about 10 cm while crimping roll 80 is about 102 cm long and has an O.D. of about 10 cm. The rolls are spaced apart from each other by a uniform gap thickness of 0.08 cm and roll 78 is rotated at an angular velocity of 41.4 sec $^{-1}$ while roll 80 is rotated at an angular velocity of 41.4 sec. $^{-1}$. As mentioned, the rib crimping operation is preferred to assure consistent production of substantially flat battery separators in automatic, high speed procution operations particuliarly where the rib providing material includes more than about 30 percent by weight isotactic polypropylene.

I claim:

1. A battery separator carrying a plurality of polymeric ribs on at least one surface, said ribs comprising a blend of from about 75 to about 97 percent by weight of total weight of polymeric component of the rib of isotactic and atactic polypropylenes and from about 3 to about 25 percent by weight of an ethylene propylene diene terpolymer.

2. A battery separator of claim 1 where said ribs comprises from about 15 to about 70 percent by weight of atactic polypropylene and from about 15 to about 60 percent by weight of isotactic polypropylene.

3. A battery separator of claim 1 where the ratio of percent by weight atactic polypropylene to percent by weight ethylene propylene diene terpolymer is no greater than about 5 to 1.

4. A battery separator of claim 1 or claim 2 or claim 3 where said ribs comprise from about 35 to about 50 percent by weight isotactic polypropylene.

5. A battery separator of claim 1 or claim 2 or claim 3 where said ribs comprise from about 15 to about 35 percent by weight isotactic polypropylene.

6. A battery separator of claim 1 or claim 2 or claim 3 where said ribs comprise successive elevated and depressed segments along the length of the rib and where said elevated segments are of substantially uniform maximum height.

7. A battery separator of claim 1 or claim 2 or claim 3 where said ribs are continuous and of substantially uniform maximum height along the entire length of the rib.

* * * * *